Sept. 27, 1932.  C. W. CUNDIFF ET AL  1,879,115
TERRACING-DITCHING AND GRADING MACHINE
Filed April 18, 1930    2 Sheets-Sheet 1
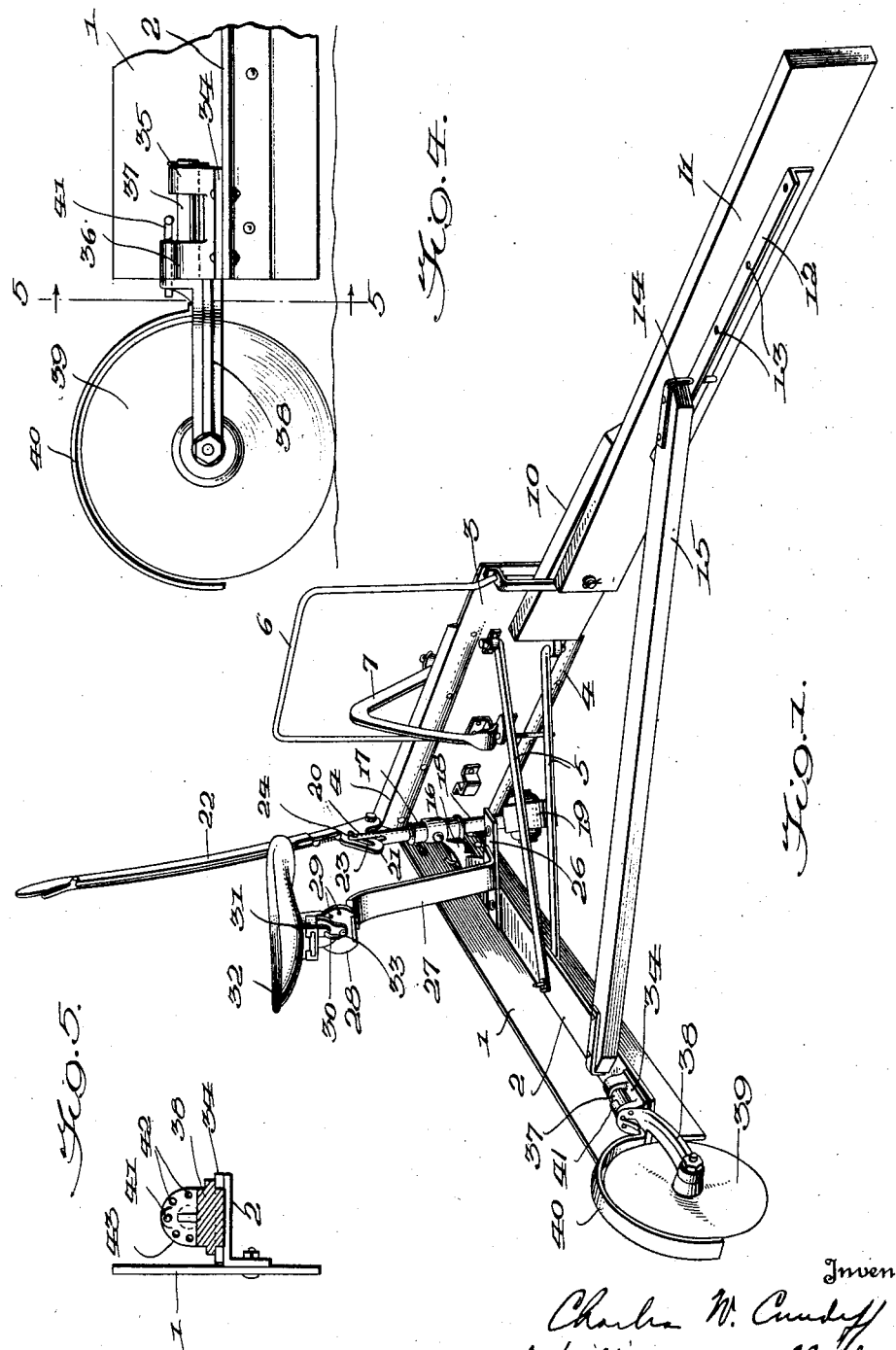

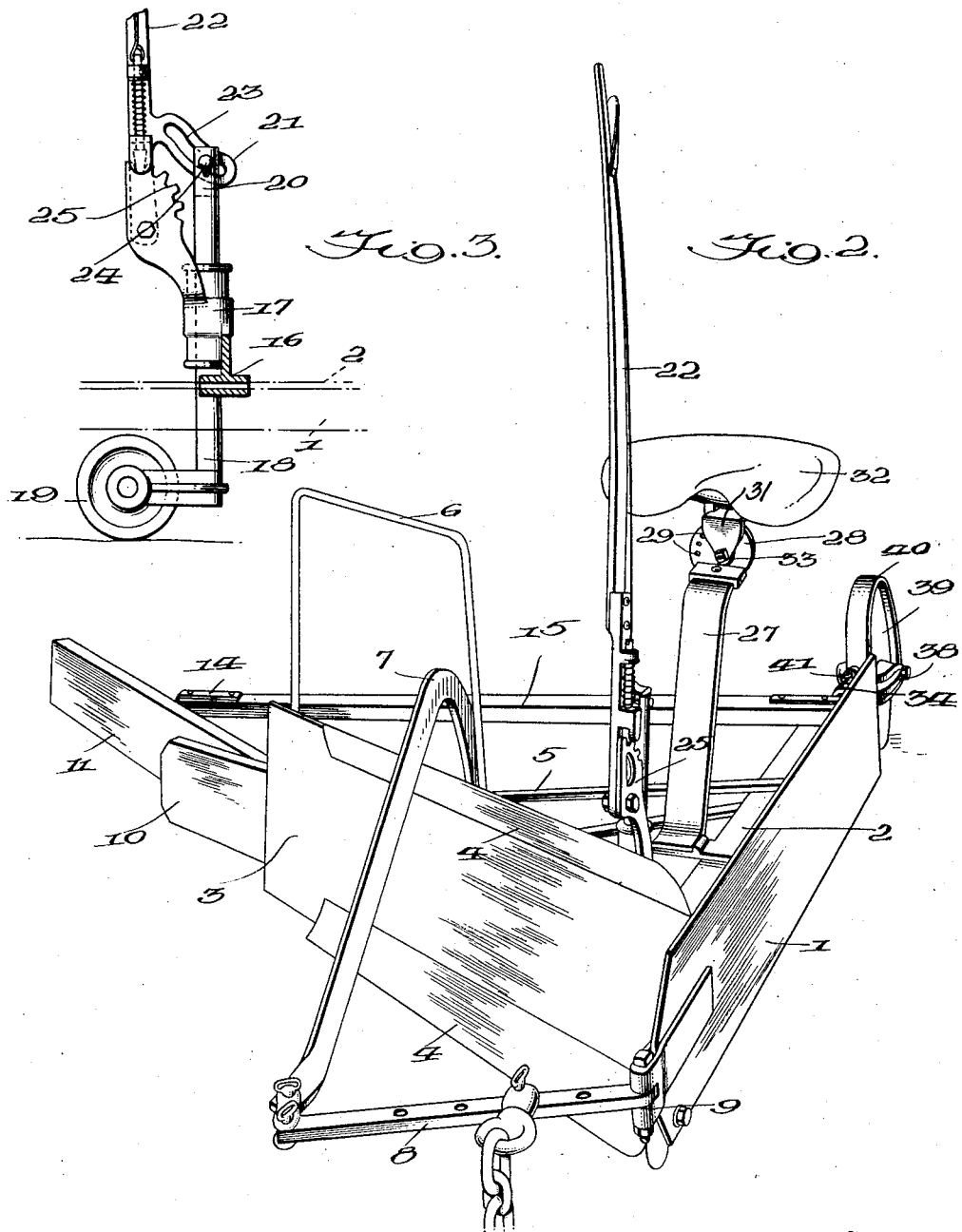

Patented Sept. 27, 1932

1,879,115

UNITED STATES PATENT OFFICE

CHARLES W. CUNDIFF AND WILLIAM A. STEELE, OF OWENSBORO, KENTUCKY, ASSIGNORS TO OWENSBORO DITCHER & GRADER CO., INC., OF OWENSBORO, KENTUCKY, A CORPORATION OF KENTUCKY

TERRACING-DITCHING AND GRADING MACHINE

Application filed April 18, 1930. Serial No. 445,444.

This invention relates to an improvement in terracing-ditching and grading machines.

The invention is an improvement on the type of machine set forth in the patent granted to Charles W. Cundiff on March 6, 1928, No. 1,661,927.

The object of the invention is to improve the machine in several respects, in order to greatly improve its operation. Provision is made for raising and lowering the front end of the blade to give perfect control at the front and making it unnecessary to turn the machine up on its back or landside in order to turn it around. The lever and wheel provided at the front not only accomplish this purpose but they also regulate the cutting of the dirt, and in case dirt clogs or grass or weeds collect on the blade, the front end may be raised to relieve the clogging and to allow the grass or weeds to slip off. An adjustable coulter is provided at the rear of the machine to hold the rear end in place and is much more effective for this purpose than the heel blades heretofore used. This coulter is adjustable so that it may be set at different angles to prevent the machine from skidding when in operation.

The seat is also made adjustable to allow the operator to sit upright regardless of the angle of the machine.

In the accompanying drawings:

Fig. 1 is a perspective view of the machine from the rear;

Fig. 2 is a similar view from the front;

Fig. 3 is a side elevation partly in section of the lever and wheel at the front of the machine;

Fig. 4 is a side elevation of the rear coulter attachment; and

Fig. 5 is a sectional view on the line 5—5 of Fig. 4.

This invention is an improvement on the type of machine set forth in the former Patent No. 1,661,927, granted March 6, 1928, and former patents assigned to the Owensboro Ditcher & Grader Co. and in which the construction and operation of this type of machines were set forth.

Referring to the drawings, the numeral 1 designates the landside, which is provided with an angle foot-board 2 riveted or otherwise secured to the inside thereof, as shown clearly in Fig. 1. Hinged to the front end of the landside 1 is a mold-board 3 having cutting blades 4 detachably secured to the opposite edges thereof. The mold-board 3 is securely braced and held in a set position by means of braces 5, which extend transversely across between the mold-board and the foot-board 2, which is attached to the landside 1. The numeral 6 indicates a hand-rail which is connected with the mold-board 3, to control the cutting action. Also connected with the mold-board and extending forwardly therefrom is a draft beam 7, the front end of which is attached to a draft bar 8, as shown in Fig. 2, the opposite end of which draft bar is hinged as at 9 to the front end of the landside 1.

An extension beam 10 is attached to the rear end of the mold-board 3. This beam is usually of wood. Extending rearwardly from the beam 10 is a long extension beam 11 provided with a bar 12 attached to the inner side thereof, which bar has holes 13 in position to receive a pin 14 carried by one end of a cross-bar 15. The opposite end of this bar is connected with the foot-board 2.

Attached to the foot-board 2 at the forward end of the landside 1 is a bracket 16, which carries a vertical bearing 17, in which is slidably mounted a rod 18. The lower end of this rod 18 receives a roller 19, while the upper end is forked as at 20 and embraces a cam segment 21, which is in turn secured to a hand lever 22. The cam segment 21 is provided with a cam slot 23 therein for receiving a bolt or pin 24, which extends therethrough and is carried by the upper end of the fork 20. The hand lever 22 has the usual pawl and ratchet, designated generally by the numeral 25 in order to hold this lever in a set position.

Attached to the foot-board 2 is a plate 26 carrying a seat standard 27. A segment 28 is fixed to the standard 27 and has holes 29 formed therein to receive a pin 30, which pin slidably extends through the seat bracket 31 fixed to and supporting the seat 32. The bracket 31 is also pivoted to the segment 28 as at 33. The pin 30 may be withdrawn from one of the holes 29 and the seat turned to an adjusted position corresponding with the angle at which the machine is operated, in order that the operator may sit upright at all times, and after such adjustment the seat is locked in that position by the pin 30.

Fixed to the back end of the foot-board 2 is a bracket 34 provided with bearings 35 and 36 for receiving a shaft 37 therein, which shaft is journaled in the bearings. A fork 38 fixed to the shaft 37 carries a coulter disk 39 and a guard 40 therefor. A pin 41 is slidably mounted in the bearing 36 above the shaft 37 and in position to enter one or more of the holes 42 formed in the segment 43, which is fixed to the shaft 37 and fork 38. In this way, the coulter disk 39 may be turned at the desired angle to prevent the machine from skidding when in operation and particularly when it is operated at an angle. This adjustment of the coulter disk allows it to be changed to correspond with the angle at which the machine is operated and it serves to effectively hold the rear end of the machine in place at all times.

The adjustment at the front of the machine serves to raise or lower the front end of the mold-board and its cutting blade and provides a perfect control at that point. It makes it unnecessary to turn the machine up on its back or landside in order to turn it around. By raising the cutting blade the machine may be easily pulled around. The wheel 19 also regulates the cutting of the dirt, and in case dirt clogs on the cutting blade or mold-boards, or grass or weeds collect thereon, the front end may be raised to relieve the clogging and to allow the grass or weeds to slip off.

We claim:

1. In a machine of the character described, the combination of a frame having an inwardly projecting flange, a blade connected with the frame and extending to the front thereof, a bearing carried by the flange, a wheel disposed at the front portion of the machine, supporting means connected with the wheels and slidably mounted in the bearing, and means connected with the supporting means for elevating the machine relative to the wheel to support the front of the machine on the wheel during turning.

2. In a machine of the character described, the combination of a landside having a horizontally projecting flange portion, a blade connected with the landside, a wheel for supporting the forward portion of the machine, a bracket fixed to the flange portion and carrying an upstanding bearing, supporting means connected with the wheel and slidably mounted in the bearing, and pivotally mounted means for adjusting the supporting means relative to the bearing.

3. In a machine of the character described, the combination of a landside having a horizontally projecting flange, a blade connected with the landside, a wheel for supporting the forward portion of the machine, a bracket fixed to the flange, and carrying an upstanding bearing, a rod supported by the wheel and slidably mounted in the bearing, a lever pivotally connected with the bearing, and cam means between the lever and rod for adjusting the rod to raise or lower the front portion of the machine.

4. In a grading machine of the character described, a bearing support, a rod slidable through said bearing support, a wheel secured to the lower end of the rod, a pivotally mounted lever, and a cam connecting the lever with the rod for adjusting the rod and bearing support relative to each other.

5. In a grading machine of the character described, the combination of a bearing support secured to the front of said machine, a rod arranged in an operating position and slidable through said bearing support, a wheel secured to and supporting the lower end of the rod, a lever pivoted to the bearing support, and a cam connecting the lever with the rod for longitudinally sliding the rod and bearing support relative to each other to raise the front portion of the machine.

6. In a grading machine of the character described, the combination of a landside, a coulter secured to the landside and being adjustable to different oblique angles relative to the landside, and means for holding the coulter in an angular adjusted position.

7. In a grading machine of the character described, the combination of a landside, a bracket connected with the landside, a shaft journaled in the bracket, a coulter connected with the shaft and adjustable to different oblique angles, and means for holding the shaft and coulter in an adjusted position.

8. In a grading machine, the combination of a frame, a coulter, means for supporting the coulter from the frame and constructed and arranged for varying the coulter to different oblique angles relative to the frame and for holding the coulter in such adjusted positions.

9. In a grading machine, the combination of a landside, a blade connected therewith, a supporting bracket connected with the landside, a horizontally disposed shaft journaled in said bracket, a coulter connected with the shaft and tilted to different oblique angles upon turning of the shaft, and means for holding the coulter in adjusted positions.

10. In a grading machine, the combination of a landside, a blade connected therewith, a coulter for the landside, and means for adjusting the coulter relative to the landside to different oblique angles.

11. In a grading machine, the combination of a landside, a blade connected therewith, a coulter for the landside, means for adjusting the coulter relative to the landside to different oblique angles and holding the same in adjusted positions, and a seat carried by the landside and angularly adjustable, to be held in a level position upon oblique adjustment of the coulter.

12. In a grading machine of the character described, the combination of a landside, a bracket connected with the landside, a shaft journaled in the bracket for turning adjustment, a coulter connected with the shaft for adjustment to different oblique angles upon turning movement of the shaft, means for holding the shaft and coulter in an adjusted position, when the machine is tilted at an angle during operation, a seat supported by the machine for angular adjustment, and means for holding said seat in a level position upon oblique adjustment of the coulter.

13. In a grading machine of the character described, the combination of a coulter mounted for adjustment to different oblique angles when the machine is operated at an angle, means for locking the coulter in an adjusted position, a seat mounted on the machine for adjustment to a level position upon adjustment of the coulter, to an oblique position.

14. In a grading machine of the character described, the combination of a normally vertical coulter mounted for adjustment to an inclined position when the machine is operated at an angle, means for locking the coulter in an adjusted position, a seat mounted on the machine for adjustment to a level position upon adjustment of the coulter to an inclined position, and means for holding said seat in said adjusted position.

15. In a grading machine, the combination of a landside, a blade connected therewith, a coulter connected with the landside and normally disposed in a vertical position, and means for supporting the coulter for adjustment relative to the landside to an inclined position and locking the coulter in adjusted positions.

16. In a grading machine, the combination of a landside, a blade connected therewith, a coulter connected with the landside and normally disposed in a vertical position, means for supporting the coulter for adjustment relative to the landside to an inclined position and locking the coulter in adjusted positions, and a seat carried by the landside and adjustable to a level position upon adjustment of the coulter to an inclined position.

17. In a machine of the character described, a supporting bracket, a horizontal shaft journaled in the bracket, and a coulter mounted on the shaft and turned to different angular positions by turning of the shaft.

18. In a machine of the character described, a landside, a supporting bracket connected therewith, a horizontal shaft journaled in the bracket, a coulter mounted on the shaft and turned to different angular positions by turning the shaft, and means for holding the coulter in adjusted positions.

19. In a grading machine, the combination of a landside, a coulter connected therewith and means for adjusting the coulter to a vertical position when the landside is tilted to approximately any angle out of a vertical position.

20. In a grading machine, the combination of a landside, a coulter connected therewith and means for adjusting the coulter to a vertical position when the landside is tilted to approximately any angle out of a vertical position, and a seat carried by the machine and angularly adjustable to be held in a level position upon tilting of the landside.

In testimony whereof we affix our signatures.

CHARLES W. CUNDIFF.
WILLIAM A. STEELE.